US006425659B1

(12) United States Patent
Katsuragi et al.

(10) Patent No.: US 6,425,659 B1
(45) Date of Patent: Jul. 30, 2002

(54) METHOD FOR ALLEVIATING KOGATION ON SURFACE OF HEATER OF INK-JET RECORDING HEAD, METHOD FOR INK-JET RECORDING, INK-JET RECORDING APPARATUS, RECORDING UNIT, AND METHOD FOR PROLONGING INK-JET RECORDING HEAD LIFE

(75) Inventors: Ryuji Katsuragi; Makoto Shioya, both of Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/511,764

(22) Filed: Feb. 24, 2000

(30) Foreign Application Priority Data

Feb. 26, 1999 (JP) .......................................... 11-050597

(51) Int. Cl.$^{7}$ ............................. B41J 2/05; G01D 11/00
(52) U.S. Cl. .......................................... 347/56; 347/100
(58) Field of Search ............................ 347/64, 100, 63, 347/54, 56, 20

(56) References Cited

U.S. PATENT DOCUMENTS 4,740,796 A * 4/1988 Endo et al. ................... 347/56
5,609,671 A 3/1997 Nagasawa ................ 106/31.65
5,713,993 A * 2/1998 Grezzo Page et al. ... 106/31.85

FOREIGN PATENT DOCUMENTS

| | | | |
|---|---|---|---|
| EP | 0 425 150 | 5/1991 | C09D/11/00 |
| JP | 54-51837 | 4/1979 | B41J/3/04 |
| JP | 3-160070 | 7/1991 | C09D/11/00 |
| JP | 5-186704 | 7/1993 | C09C/1/56 |
| JP | 8-3498 | 1/1996 | C09D/11/00 |

OTHER PUBLICATIONS

Willian J. Lloyd and Howard H. Taub, "Ink Jet Printing" 1988 by Academic Press, Inc., "Output Hardcopy Devices", pp. 340–341.*

* cited by examiner

*Primary Examiner*—John Barlow
*Assistant Examiner*—Juanita Stephens
(74) *Attorney, Agent, or Firm*—Fitzpatrick, Cella, Harper & Scinto

(57) ABSTRACT

A method for decreasing scorch deposition on the surface of the heater provided in a recording head of an ink-jet printer to heat ink is characterized in that the heater has an outermost protection layer containing a metal and/or metal oxide and the above ink comprises (a) a coloring material, (b) a liquid medium, and (c) at least one compound selected from the group consisting of aldaric acid and aldarates.

36 Claims, 3 Drawing Sheets

METHOD FOR ALLEVIATING KOGATION ON SURFACE OF HEATER OF INK-JET RECORDING HEAD, METHOD FOR INK-JET RECORDING, INK-JET RECORDING APPARATUS, RECORDING UNIT, AND METHOD FOR PROLONGING INK-JET RECORDING HEAD LIFE

BACKGROUND OF THE INVENTION

1. Field of the Invention

This invention relates to a method for decreasing kogation on the surface of a heater for application of heat to the ink, a method for ink-jet recording, an ink-jet recording apparatus, a recording unit, and a method for increasing the life of the ink-jet recording head.

2. Related Background Art

The have been proposed various types of ink-jet recording methods. According to one ink-jet recording method, such as the so-called bubble-jet recording method described in, for example, Japanese Patent Application Laid-Open No. 54-51837, ink is ejected in the form of ink droplets by the action of thermal energy. A feature of this ink-jet method is that high quality images can be formed on plain paper having no special coating layer at high speed and at low cost, due to the very simple structure of the high-density multiple nozzles.

In this recording method, rapid heating of the heater in the recording head induces bubble generation in the liquid on the heater with rapid bubble volume inflation, and the action force due to this rapid volume increase ejects a liquid droplet from the nozzle arranged at the tip of the recording head to make the droplet fly to the recording material and attach thereon. Recording is thus carried out. In this method, however, the heater in the recording head is repeatedly heated to eject ink during printing. This may cause the deposition of the decomposition product of the ink, so-called “koga” (scorch), on the surface of the heater. Deposition of koga prevents the efficient transmission of the thermal energy from the heater to the ink, resulting in decrease in the volume and speed of the ejected droplets in comparison with the initial stage, which affects the image quality. In such a case, the recording head must be changed with a new one in order to continuously achieve high quality printing. To the users, this means a total higher printing cost. Thus, reduction of kogation on the heater in order to prolong the recording head life has been one of the important technical problems to be addressed in the art of bubble-jet recording.

There has been proposed, for example, ink containing an oxoanion (Japanese Patent Application Laid-Open No. 3-160070), such as phosphate salts, polyphosphates, phosphate esters, arsenates, molybdates, sulfates, sulfites and oxalates.

SUMMARY OF THE INVENTION

An object of the present invention is to provide a method for decreasing kogation on the surface of the heater used for applying thermal energy to the ink in a recording head so as to eject the above ink from the recording head.

Another object of the present invention is to provide an ink-jet recording apparatus which enables high quality printing and prolonged product life of the recording head.

A further object of the present invention is to provide a recording unit which enables high quality printing over a prolonged period.

Still another object of the present invention is to provide a method for prolonging the product life of the recording head to lower the cost in high quality printing.

According to one aspect of the present invention, there is provided a method for alleviating kogation on a surface of a heater of a recording head of an ink-jet printer, the heater being arranged to apply thermal energy to ink in the recording head to eject the ink from an opening in the recording head, and the heater having an outermost protection layer containing at least a metal or oxide thereof, wherein the ink comprises the following components:

(a) a coloring material;

(b) a liquid medium; and (c) at least one compound selected from the group consisting of aldaric acids and aldarates.

Such an arrangement makes possible a very effective reduction in kogation on the outermost protection layer of the heater. Although the reason why the use of this ink brings about good results is not unknown, it may be due to the interaction between the aldaric acid and/or aldarate with the metal and/or metal oxide constituting the outermost protection layer of the above heater, which interaction may prevent kogation or promote the decomposition of koga or peeling of koga from the heater surface.

When the metal or the metal oxide contained in the outermost protection layer of the heater is tantalum or an oxide thereof, the effect is more remarkable. Further, the effect of the present invention in preventing kogation improves if the amount of the energy applied to the above heater is set so that Eop satisfies the following relation:

$$1.10 \leqq Eop/Eth \leqq 1.50,$$

wherein Eop denotes the amount of the energy applied to the above heater and Eth the minimum energy required for ink ejection.

According to another aspect of the present invention, there is provided an ink-jet recording method comprising the steps of:

applying pulse electric signals to a heater in an ink flow path of a recording head according to recording signals, generating heat from the heater to heat ink in the ink flow path and ejecting the ink from an opening, wherein the ink comprises the following components:

(a) a coloring material;

(b) a liquid medium; and (c) at least one compound selected from the group consisting of aldaric acids and aldarates.

According to a further aspect of the present invention, there is provided an ink-jet recording apparatus comprising:

an ink storing portion storing ink;

an ink-jet recording head provided with a heater for applying thermal energy to the ink introduced in an ink flow path from the ink storing portion; and means for applying electrical pulse signals to the heater in response to recording information, wherein the heater has an outermost protection layer containing at least one of a metal and an oxide thereof, and the ink comprises the following components:

(a) a coloring material;

(b) a liquid medium; and (c) at least one compound selected from the group consisting of aldaric acids and aldarates.

According to still another aspect of the present invention, there is provided a recording unit comprising an ink storing portion for storing ink and an ink-jet recording head portion for ejecting the ink through an opening by thermal energy action, the ink-jet recording head being provided with a heater for applying thermal energy to the ink, the heater having an outermost protection layer containing at least a metal or oxide thereof, wherein the ink comprises the following components:

(a) a coloring material;

(b) a liquid medium; and (c) at least one compound selected from the group consisting of aldaric acids and aldarates.

According to still another aspect of the present invention, there is provided a method for prolonging a life of a recording head equipped with a heater, the recording head being used in an ink-jet recording method comprising a step of ejecting ink through an opening by applying thermal energy to the ink, wherein the heater is provided with an outermost protection layer containing at least a metal or oxide thereof and the ink comprises the following components:

(a) a coloring material;

(b) a liquid medium; and (c) at least one compound selected from the group consisting of aldaric acids and aldarates.

DETAILED DESCRIPTION OF THE PREFERRED EMBODIMENTS

Figure 1:
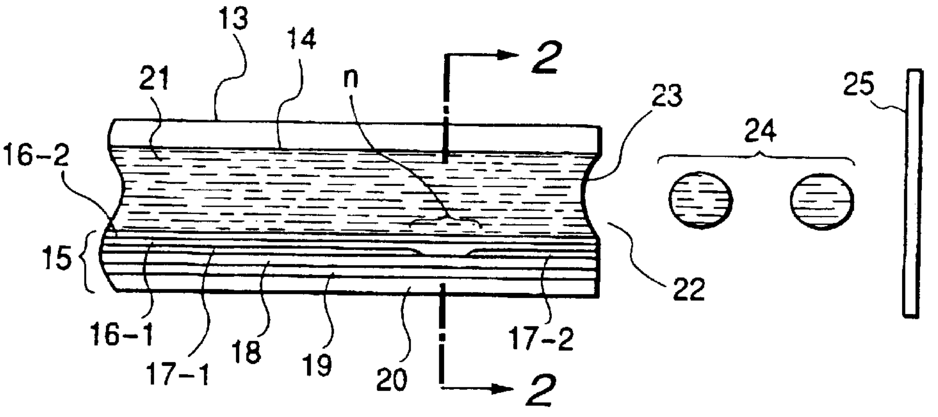
FIG. 1 is a vertical sectional view of a nozzle one example head of an ink-jet recording apparatus.

The present invention will be described in further detail with reference to the preferred embodiments.

<Aldaric Acids and Aldarates>

First, aldaric acids and aldarates will be explained. The inventors of the present invention studied intensively a method for decreasing kogation on the surface of a heater provided in an ink-jet recording head for ink-jet recording in which ink is ejected as ink droplets by the action of thermal energy, and they have found that such kogation is very effectively reduced when the ink contains at least one of aldaric acids and aldarates, preferably tartaric acid or a salt thereof. This finding led to the present invention.

Aldaric acid is a polyoxydicarboxylic acid obtainable by oxidizing both the aldehyde group and the primary alcohol group of an aldose into carboxyl groups and has the following general formula:

$$HOOC(C^*HOH)_nNCOOH,$$

wherein n is an integer of 1 or more and C* represents an asymmetric carbon atom.

There exist many optical isomers of an aldaric acid, since aldaric acid has one or more asymmetric carbon atoms, as shown in the above general formula. Aldaric acids having 5 or more carbon atoms (n=3 or more in the above general formula) form mono- or dilactones upon dehydration, but with different readiness. Monolactone is also called lactonic acid, and two types are present according to which carboyxl group is used, depending on the conditions.

Aldaric acids are classified according to the carbon number: those having 3 carbon atoms (n=1 in the above general formula) are generally called triaric acids, those having 4 carbon atoms (n=2 in the above general formula) tetraric acids, those having 5 carbon atoms (n=3 in the above general formula) pentaric acids (pentosaccharic acid), and those having 6 carbon atoms (n=4 in the above general formula) hexaric acids (hexosaccharic acid). Aldaric acid is exemplified by, for example, tartronic acid having 3 carbon atoms (n=1 in the above general formula); tartaric acid having 4 carbon atoms (n=2 in the above general formula); xylosaccharic acid, ribosaccharic acid and arabosaccharic acid having 5 carbon atoms (n=3 in the above general formula); glucosaccharic acid, mannosaccharic acid, idosaccharic acid, mucic acid, talomucic acid and allomucic acid having 6 carbon atoms (n=4 in the above general formula). Some of them have D-form, L-form, meso-form and DL-form.

Tartaric acid is the most preferable aldaric acid used in the present invention. Tartaric acid has D-form, L-form, DL-form and meso-form, any of which are applicable. However, the L-form, that is, L-tartaric acid, is readily available.

Tartrates include lithium tartrate, sodium tartrate, potassium tartrate, magnesium tartrate, calcium tartrate, barium tartrate, iron (II) tartrate, copper (II) tartrate, ammonium tartrate, and organic ammonium salts of tartrate acid. Preferably, lithium tartrate, sodium tartrate, potassium tartrate, potassium sodium tartrate and an ammonium salt of tartrate acid are used. These compounds can be used alone or in combination of two or more of them.

<Content of Aldaric Acid, Aldarate>

The total content of aldaric acids and aldarates in the ink is preferably 0.005–20 wt %, more preferably 0.05–12 wt %, of the total ink weight. Ink containing aldaric acid within the above range can effectively reduce kogation on the heater, while hardly affecting the ink-jet ejection properties. It is also advantageous in cost.

The total content of at least one compound selected from tartaric acid and tartrates is 0.005–20 wt % of the total ink weight. Preferably, at least one compound selected from tartaric acid, lithium tartrate, sodium tartrate, potassium tartrate and potassium sodium tartrate constitutes 0.05–12 wt % of the total amount of the ink. If the total content is less than 0.005 wt %, there is no effect on the reduction of kogation. On the other hand, if the total content is more than 20 wt %, it is disadvantageous as to cost since no further effect is achieved.

<Coloring material>

The coloring materials used in this invention will now be described. As coloring materials, dyes or pigments are preferably used.

The dyes applicable to the invention include any kind of dyes, such as direct dyes, acid dyes, basic dyes and disperse dyes. In particular, dyes exemplified below can be used alone or in combination.

C.I. DIRECT BLACK -4, -9, -11, -17, -19, -22, -32, -80, -151, -154, -168, -171, -194, -195;

C.I. DIRECT BLUE -1, -2, -6, -8, -22, -34, -70, -71, -76, -78, -86, -142, -199, -200, -201, -202, -203, -207, -218, -236, -287;

C.I. DIRECT RED -1, -2, -4, -8, -9, -11, -13, -15, -20, -28, -31, -33, -37, -39, -51, -59, -62, -63, -73, -75, -80, -81, -83, -87, -90, -94, -95, -99, -101, -110, -189, -225, -227;

C.I. DIRECT YELLOW -1, -2, -4, -8, -11, -12, -26, -27, -28, -33, -34, -41, -44, -48, -86, -87, -88, -132, -135, -142, -144;

C.I. FOOD BLACK -1, -2;

C.I. ACID BLACK -1, -2, -7, -16, -24, -26, -28, -31, -48, -52, -63, -107, -112, -118, -119, -121, -172, -194, -208;

C.I. ACID BLUE -1, -7, -9, -15, -22, -23, -27, -29, -40, -43, -55, -59, -62, -78, -80, -81, -90, -102, -104, -111, -185, -254;

C.I. ACID RED -1, -4, -8, -13, -14, -15, -18, -21, -26, -35, -37, -52, -249, -257, -289;

C.I. ACID YELLOW -1, -3, -4, -7; -11, -12, -13, -14, -19, -23, -25, -34, -38, -41, -42, -44, -53, -55, -61, -71, -76, -79;

C.I. REACTIVE BLUE -1, -2, -3, -4, -5, -7, -8, -9, -13, -14, -15, -17, -18, -19, -20, -21, -25, -26, -27, -28, -29, -31, -32, -33, -34, -37, -38, -39, -40, -41, -43, -44, -46;

C.I. REACTIVE RED -1, -2, -3, -4, -5, -6, -7, -8, -11, -12, -13, -15, -16, -17, -19, -20, -21, -22, -23, -24, -28, -29, -31, -32, -33, -34, -35, -36, -37, -38, -39, -40, -41, -42, -43, -45, -46, -49, -50, -58, -59, -63, -64, -180;

C.I. REACTIVE YELLOW -1, -2, -3, -4, -6, -7, -11, -12, -13, -14, -15, -16, -17, -18, -22, -23, -24, -25, -26, -27, -37, -42;

C.I. REACTIVE BLACK -1, -3, -4, -5, -6, -8, -9, -10, -12, -13, -14, -18;

PROJET FAST CYAN 2 (available from Zeneca), PROJET FAST M AGENTA 2 (available from Zeneca), PROJET FAST YELLOW 2 (available from Zeneca), PROJET FAST BLACK 2 (available from Zeneca), etc.

Dyes for use in the ink according to the present invention are not limited to these examples.

(Pigment)

Pigments applicable to the present invention include any kind of pigments, such as inorganic pigments and organic pigments.

In particular, the pigments below can be used alone or in combination.

CARBON BLACK

C.I. PIGMENT YELLOW -1, -2, -3, -12, -13, -14, -16, -17, -73, -74, -75, -83, -93, -95, -97, -98, -114, -128, -129, -151, -154, -195;

C.I. PIGMENT RED -5, -7, -12, -48 (Ca), -48 (Mn), -57 (Ca), -57: 1, 57 (Sr), 112, 122, 123, 168, 184, 202;

C.I. PIGMENT BLUE -1, -2, -3, -15: 3, -15 34, -16, -22, -60;

C.I. VAT BLUE -4, -6, etc.

<Dispersant>

When the above pigments are used, it is preferable to use a dispersant to stably disperse the pigments in the ink. The dispersants applicable to the present invention include high molecular dispersants and surfactant-based dispersants. Specific examples of polymeric dispersants are polyacrylate, salts of styrone-acrylic acid copolymer, salts of styrene-methacrylic acid copolymer, salts of styrene-acrylic acid-acrylic ester copolymer, salts of styrene-maleic acid copolymer, salts of acrylic ester-maleic acid copolymer, salts of styrene-methacrylicsulfonic acid copolymer, salts of vinylnaphthalene-maleic acid copolymer, salts of β-naphthalenesulfonic acid formalin condensation product, poly(vinylpyrrolidone), polyethylene glycol and poly(vinyl alcohol). Preferably the weight average molecular weight of the polymeric dispersants is in the range of 1000–30000, and the acid value of the same is in the range of 100 to 430. Examples of surfactant-based dispersants include laurylbenzene esulfonate, lauryl sulfonate, laurylbenzene-carboxylate, laurylnaphthalene sulfonate, salts of aliphatic amine, and poly(ethylene oxide) condensation product. The amount of the dispersants used is preferably in the range of pigment weight dispersant weight of 10:5 to 10:0.5.

Also applicable is carbon black that has been made self-dispersable by introducing water-soluble groups onto the surface as described in Japanese Patent Application Laid-Open No. 5-186704 and Japanese Patent Application Laid-Open No. 8-3498. When using such a self-dispersing type carbon black, a dispersant is not necessary.

These dyes and pigments may be used alone or in combination. Generally, the content of these dyes and pigments is properly selected from the range of 0.1–20 wt % of the total ink weight.

<Liquid Media>

The liquid medium used in the present invention will now be described. As a liquid medium, preferably water and water-soluble solvents are used together.

Preferably, the water used in the present invention is deionized water, not ordinary water which contains various ions. The water content is preferably in the range of 35–96 wt % of the total amount of the aqueous pigment ink.

Water-soluble organic solvents are used to adjust the ink viscosity, to slow down the ink drying rate and to enhance the solubility of coloring materials in ink so as to prevent clogging of the nozzles of the recording head. The above solvent is exemplified by alkyl alcohols of 1–5 carbon atoms such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones or keto alcohols such as acetone, diacetone alcohol; ethers such as tetrahydrofuran and dioxane; oxyethylene or oxypropylene copolymers such as diethylene glycol, triethylene glycol, tetraethylene glycol, dipropylene glycol, tripropylene glycol, polyethylene glycol and polypropylene glycol; alkylene glycols having an alkylene group of 2–6 carbon atoms, such as ethylene glycol, propylene glycol, trimethylene glycol, triethylene glycol, 1,2,6-hexantriol; glycerol; trimethylolethane, trimethylolpropane; lower alkyl ethers such as ethylene glycol monomethyl (or monoethyl) ether and diethylene glycol monomethyl (or monoethyl) ether; lower dialkyl ethers of polyhydric alcohol, such as triethylene glycol dimethyl (or diethyl) ether and tetraethylene glycol dimethyl (or diethyl) ether; alkanolamines such as monoethanolamine, diethanolamine and triethanolamine; sulfolane, N-methyl-2-pyrrolidone, 2-pyrrolidone, and 1,3-dimethyl- 2-imidazolydinone. The above water-soluble organic solvents can be used individually or as a mixture of two or more solvents.

<Additives>

The ink of the present invention may contain a pH adjusting agent to stabilize the pH of the ink, thereby stabilizing the solubility of dyes or dispersibility of pigment in the ink. The pH adjusting agent is exemplified by hydroxides such as lithium hydroxide, sodium hydroxide, potassium hydroxide and ammonium hydroxide; sulfates such as lithium sulfate, sodium sulfate, potassium sulfate and ammonium sulfate; carbonates such as lithium carbonate, sodium carbonate, sodium hydrogencarbonate, potassium carbonate, potassium hydrogencarbonate, potassium sodium carbonate, ammonium carbonate and ammonium hydrogencarbonate; phosphates such as lithium phosphate, monosodium phosphate, disodium phosphate, trisodium phosphate, monopotassium phosphate, dipotassium phosphate, tripotassium phosphate, monoammonium phosphate, diammonium phosphate and triammonium phosphate; acetates such as lithium acetate, sodium acetate, potassium acetate and ammonium acetate.

These salts may be added to the ink alone, but more preferably in combination. The salts of preferably 0.1–10 wt %, more preferably 1–8 wt %, are added to the ink. If the content is less than 0.1 wt %, it is difficult to keep the pH of the ink constant and thereby the solubility of the aqueous dye in the ink cannot be stabilized effectively. On the other hand, if the content is more than 10 wt %, crystals of these salts will be deposited, causing undesirable nozzle clogging.

In addition to the above components, according to the situation, various types of known additives, for example, viscosity adjusting agents, antimolds, antiseptics, antioxidants, antifoaming agents, surfactants, and antidrying agents such as urea for preventing nozzles from drying up, can be properly used in the ink of the present invention.

<Physical Properties of Ink>

Physical properties of the ink according to the present invention are: the pH is preferably in the range of 3–12, more preferably 4–10 at around 25° C.; the surface tension is preferably in the range of 10–60 dyn/cm, more preferably 15–50 dyn/cm; and the viscosity is preferably in the range of 1–30 cps, more preferably 1–10 cps.

<Recording Method>

The method suitable for recording with the ink of the present invention is the ink-jet recording method in which ink droplets are formed by the thermal energy applied to the ink according to recording signals in the recording head. A recording apparatus in which the ink of the present invention described above is used is described with reference to the drawings.

Figure 2:
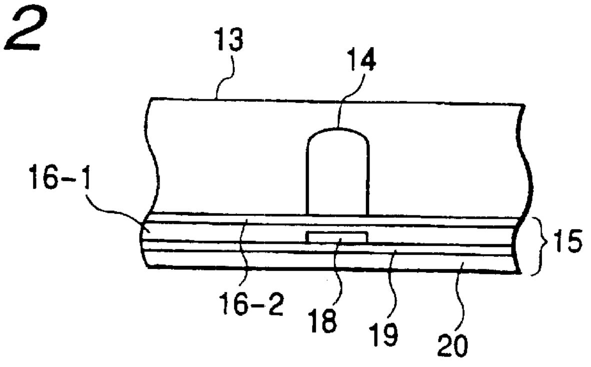
FIG. 2 is a horizontal section view of the nozzle of the one example head of the ink-jet recording apparatus.

First, FIGS. 1 and 2 show an example of the constitution of the main part of an ink-jet recording apparatus which utilizes thermal energy. FIG. 1 is a sectional view of a head 13 taken along the ink flow path, and FIG. 2 is a sectional view taken along line 2—2 of FIG. 1. The head 13 is prepared by gluing a substrate with a heat generating element 15 to a board of glass, ceramic, silicon, polysulfone or plastic, in which a flow path (nozzle) 14 for ink is provided. The substrate with heat generating element 15 comprises a protection layer 16-1 made of silicon oxide, silicon nitride or silicon carbide, an outermost protection layer 16-2 made of a metal or metal oxide thereof, preferably made of tantalum or an oxide of tantalum, electrodes 17-1 and 17-2 made of aluminum, gold or an aluminum-copper alloy, a heat generating resistor layer 18 made of a high melting point material such as hafnium boride, tantalum nitride or aluminum tantalate, a heat accumulation layer 19 made of silicon oxide or aluminum oxide, and a substrate 20 made of a heat-radiative material such as silicon, aluminum or aluminum nitride.

Figure 3:
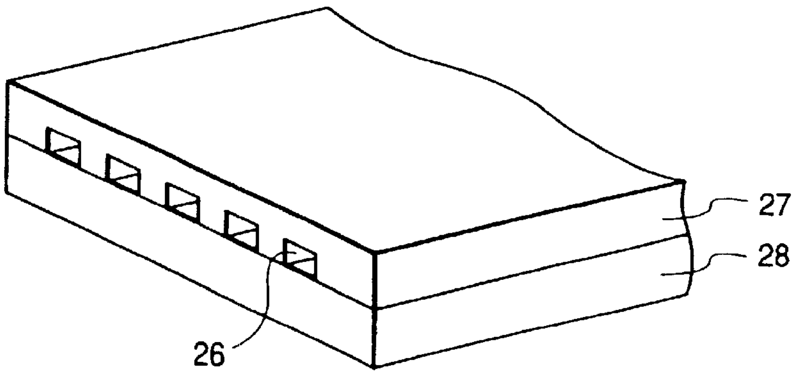
FIG. 3 shows an external appearance in perspective of a head having several nozzles like that shown in FIG. 1.

When electric pulse signals are applied to the electrodes 17-1 and 17-2 of the above head 13, the region designated with n (heater) of the heat generating substrate 15 rapidly generates heat, thereby forming a bubble in the ink 21 in contact with the above region. Due to the pressure of the bubble, the meniscus 23 protrudes to eject the ink 21 through the nozzle 14 of the head, and the ink ejected from an ink discharge orifice 22 as a droplet flies toward and lands on a recording medium 25. FIG. 3 shows an outer view of one example of the multi-nozzle type recording head in which nozzles of the head shown in FIG. 1 are aligned in an integral unit. This multi-nozzle type recording head is prepared by gluing a glass plate 27 having plural nozzles 26 and a heat generating base 28 as described in FIG. 1.

<Amount of Energy Applied to Heater>

The energy to be applied to the heater will now be described. When the width of the pulse applied to the bubble jet head is denoted by P (when multiple pulses are applied separately, the sum of each pulse width is denoted by P), the voltage applied to the head is denoted by V and the resistance of the heater is denoted by R, then the energy E applied to the heater can be expressed by the following equation:

$$E=P\times V^2/R \quad (1).$$

When the lowest energy with which the bubble jet head can eject ink is denoted by Eth and the energy actually applied to the heater is denoted by Eop, then the value r is obtained from the following equation:

$$r=\mathrm{Eop}/\mathrm{Eth} \quad (2).$$

To determine r from the operation conditions of the bubble jet head, there are, for example, two methods shown below.

Method 1. Fixed Pulse Width

The bubble jet head is operated at a given pulse width and at a proper voltage at which the above head can eject ink. Then the voltage is lowered slowly so as to find a voltage at which ejection stops. The threshold voltage is a voltage immediately before the voltage at which ejection stopped and denoted by Vth. If the voltage actually used to operate the head is denoted by Vop, then a value r is obtained from the following equation:

$$r=(\mathrm{Vop}/\mathrm{Vth})^2.$$

Method 2. Fixed Voltage

The bubble jet head is driven at a given voltage with a proper pulse width at which the above head can eject ink. Then the pulse width is decreased slowly so as to find a pulse width at which ejection stops. Let Pth denote the minimum pulse width just before the determined pulse width. If the pulse width actually used to drive the head is denoted by Pop, then a value r is obtained from the following equation:

$$r=\mathrm{Pop}/\mathrm{Pth}.$$

The above voltage means the voltage actually applied to the BJ heater to generate heat. The voltage applied from outside of the head may decrease due to the contracts, wiring resistance, etc. When Vth and Vop are measured from the outside of the head, both voltage measurements include the voltage fluctuation. Accordingly, unless the fluctuations are considerably large, the value r calculated directly using the measured values can be used without serious error.

It should be noted that, when carrying out recording with an actual printer, multiple heaters are driven at the same time, which can cause the voltage applied to one heater to fluctuate.

From the above equations (1) and (2), it appears that $V^2$ is inversely proportional to P when r is constant. Actually, the relationship between $V^2$ and P is not so simple, since there are various intertwining problems: an electrical problem that the pulse shape does not become rectangular, a thermal problem that the thermal diffusion in the vicinity of the heater differs with the shape of the pulse, and a problem peculiar to ink-jet heads in that the thermal flow from the heater to the ink varies with the voltage to change the bubbling state. Accordingly, Method 1 and Method 2 described above should be treated independently. It is noted that errors may arise if the value obtained from one method is converted to that of the other method by calculation. Unless otherwise specified, the value r obtained by Method 1 is used in the present invention.

Generally, the head is driven at an r value of about 1.12–1.96 to eject ink in a stable manner. However, when the ink of the present invention, which comprises at least one compound selected from the group of aldaric acids and aldarates, is used for ejection from a recording head by applying thermal energy thereto, the head is preferably driven at an r value in a predetermined range, that is, in the range of 1.10–1.50. This enables prevention of kogation on the heater and thereby lengthens the recording head life. The reasons why kogation can be effectively prevented and the life of the recording head increased in this r range is not yet known. However, it is believed that the temperature of the heater surface is never excessively raised since no excessive energy is supplied thereto, which prevents an excessive corrosion of the metal by aldaric acids or aldarates.

Figure 4:
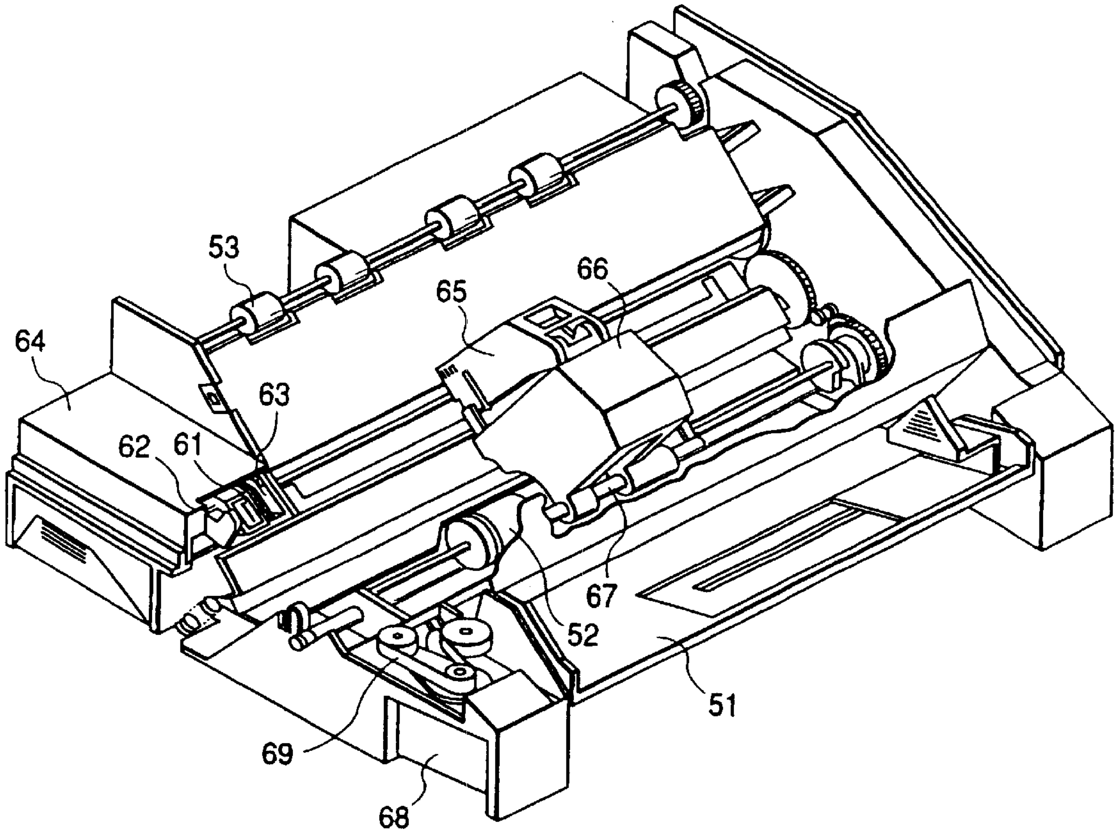
FIG. 4 is a schematic view in perspective of one example ink-jet recording apparatus.

FIG. 4 shows one example of the ink-jet recording apparatus in which such a head is incorporated. In FIG. 4, reference numeral 61 designates a blade as a wiping member which is supported with and fixed to a blade-supporting member at one end and has a cantilever-like shape. The blade 61 is arranged in a position adjacent to the recording region of a recording head 65. In this example, the blade is held so as to project into the path along which the recording head 65 moves.

Reference numeral 62 designates a cap for an ejection opening of the recording head 65. The cap is arranged at a home position adjacent to the blade 61 and moves in the direction perpendicular to the moving direction of the recording head 65 so as to cap the ink-ejecting opening when touching it. Numeral 63 designates an ink-absorber provided adjacent to the blade 61, which is held so as to project into the moving path of the recording head 65 like the blade 61. The above blade 61, cap 62 and ink-absorber 63 constitute an ejection recovery portion 64, and the blade 61 and the ink-absorber 63 serve to remove moisture and dust on the ink-ejecting opening.

Reference numeral 65 designates a recording head. The head contains a means for generating ink-ejecting energy and performs recording by ejecting ink towards a recording medium opposite to the ink-ejecting opening. Numeral 66 designates a carriage for carrying the recording head 65 so that it can move. The carriage 66 is engaged with a guide shaft 57 in a slidable manner, and a part of the carriage 66 is connected to a belt 69 driven by a motor 68. Thus the carriage 66 can move along the guide shaft 67, and the recording head 65 can move in the recording region and the region adjacent thereto.

Reference numeral 51 designates a paper feeding portion for inserting a recording medium and numeral 52 designates a paper-delivery roller driven by a motor not shown in the figure. With such an arrangement, the recording medium is fed to the position opposite to the ink ejecting opening of the recording head 65 and conveyed to a paper output portion provided with a paper output roller 53 as recording proceeds. In the above arrangement, while the recording head returns to its home position after recording, the cap 62 of the ejection recovery portion 64 retracts from the moving path of the recording head, but the blade 61 projects into the moving path. As a result, the ink ejecting opening of the recording head 65 is wiped.

The cap 62 moves into the moving path of the recording head 65 in a projecting manner to touch the ejection opening of the head 65 for capping. While the recording head 65 is moving from its home position to a recording start position, the cap 62 and the blade 61 take the same position as when wiping is carried out. As a result, the ejecting opening of the head 65 is wiped even during this movement. The recording head not only returns to its home position after completion of recording and during ejection recovery, but also returns to the home position adjacent to the recording region at prescribed intervals while moving in the recording region. With this movement, the above wiping is also carried out.

Figure 5:
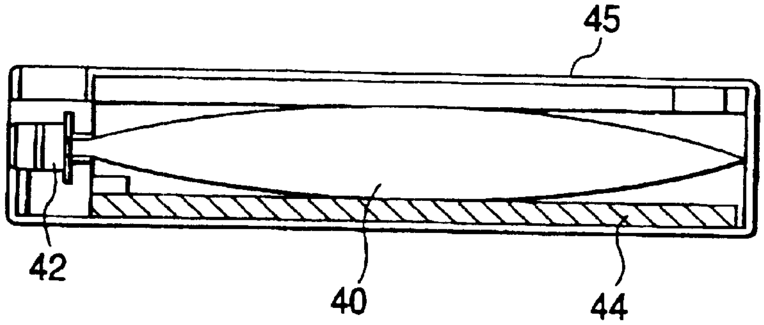
FIG. 5 is a vertical section view of one example ink cartridge.

FIG. 5 shows one example of an ink cartridge which stores and feeds ink to the recording head through an ink feeding member, such as a tube. In the drawing, reference numeral 45 denotes a member constituting the ink cartridge, with an ink storage portion such as ink bag 40, and a tip equipped with a rubber stopper 42. The ink in the ink bag 40 can be fed to the recording head by inserting a needle (not shown in the figure) into the stopper 42. Numeral 44 designates an ink absorber for receiving waste ink. For the ink storage portion, its surface in contact with ink is preferably made of a polyolefin, particularly polyethylene.

Figure 6:
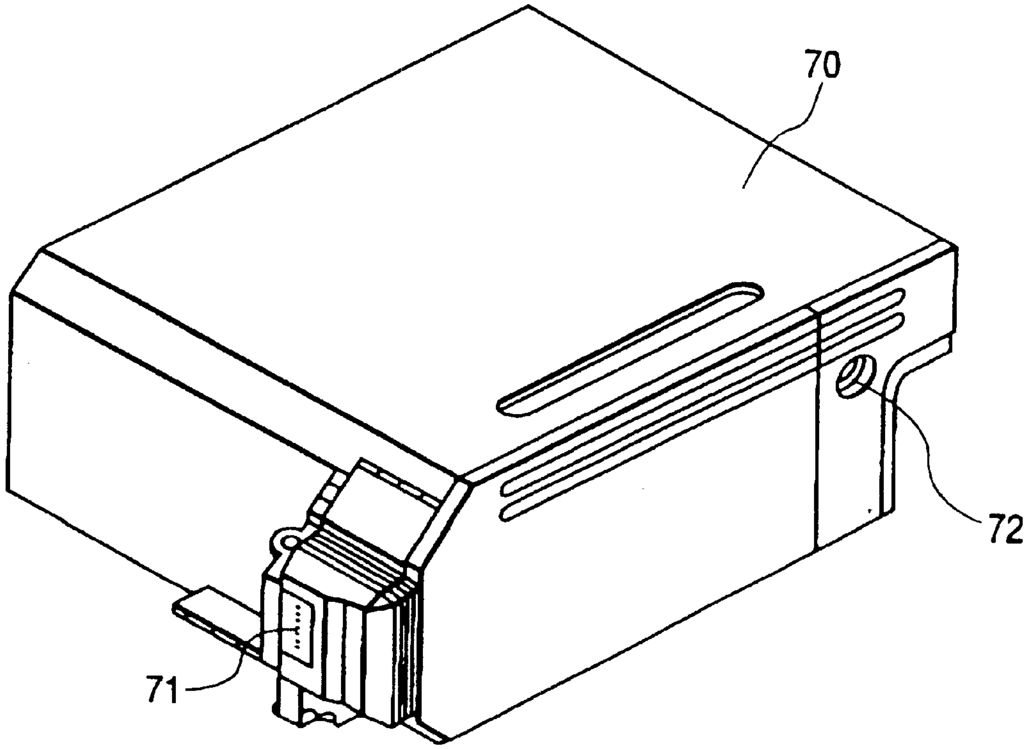
FIG. 6 is a perspective view of one example recording unit.

The ink-jet recording apparatus for use in the present invention is not limited to the aforementioned type in which an ink cartridge is not furnished as an integral part of the head, as shown in FIG. 6. The type in which the above two are integrated into one part is also preferably used. In FIG. 6, reference numeral 70 designates a recording unit which contains an ink storage portion for storing ink, for example, an ink absorber. In the arrangement of the above unit, ink in the ink absorber is ejected as an ink droplet from a head portion 71 having multiple orifices. As a material for the ink absorber, polyurethane is preferably used in the present invention. An ink bag having a spring therein may be used for an integrated ink cartridge and head in which no ink absorber is used. Numeral 72 designates an opening for connecting the inside of the cartridge with air. This recording unit 70 is used in place of the recording head 65 shown in FIG. 4 and is detachably attached to the carriage 66.

As described above, the present invention provides ink, for use in an ink-jet recording head utilizing thermal energy, which enables elongation of the life of the recording head by decreasing kogation on the heater thereof, a method for increasing the life of the recording head by decreasing kogation on the heather thereof, a method for ink-jet printing utilizing the above ink, and an ink-jet recording apparatus for the ink.

EXAMPLES

The present invention is explained in more detail with reference to the following examples and comparative examples. These examples are intended to illustrate the invention and are not construed to limit the scope of the invention. Unless otherwise stated, “parts” and “%” are expressed by weight.

Examples 1–3 and Comparative Example 1

In Example A and Comparative Example A, the following components were mixed, well-stirred and dissolved, then subjected to pressure filtration with a microfilter of 0.2 μm in pore size (from Fuji Photo Film Co., Ltd.) to prepare the ink. Ink of Comparative Example A differs from that of Example A in that it does not contain disodium tartrate dihydrate.

| | |
|---|---|
| Ink Composition of Example A | |
| PROJET FAST BLACK 2 (available from Zeneca) | 2 parts |
| diethylene glycol | 10 parts |
| disodium tartrate dihydrate | 2 parts |
| sodium hydroxide | 0.1 parts |
| water | 85.9 parts |
| Ink Composition of Comparative Example A | |
| PROJET FAST BLACK 2 (available from Zeneca) | 2 parts |
| diethylene glycol | 10 parts |
| sodium hydroxide | 0.1 parts |
| water | 87.9 parts |

[Evaluation 1]

Vth (threshold voltage for ejecting ink) was measured at pulse widths of 1.1 μs (on) +3.0 μs (off) +3.2 μs (on) and an operation frequency of 6250 Hz, using the ink of Example A described above and an ink-jet recording apparatus having an on-demand type multiple recording head (BC-02, from Canon Inc., in which the outermost protection layer on the heater consists of tantalum and an oxide thereof), with the ink being ejected by applying thermal energy according to recording signals. Then the ejection durability and kogation amount were estimated at Vop (operation voltage) calculated from the following equation:

$$Vop=\sqrt{r}\times Vth.$$

In Example 1, the estimation was made at the Vop corresponding to r=1.39.

In Examples 2 and 3, estimation was carried out at Vop values corresponding to r=1.10 and R=1.48, respectively. In these examples, ink of Example A was used.

In Reference Examples 1, 2 and 3, evaluation was carried out at Vop (drive voltage) values corresponding to r=1.56, r=1.61 and r=1.69, respectively.

In Comparative Example 1, evaluation was carried out at Vop (drive voltage) corresponding to r=1.39, using ink of Comparative Example A. The results are shown in Table 1.

Ejection Durability

Continuous ejection was performed by using the above apparatus and operation conditions. The ink droplets of $1\times10^6$ shots, ejected from the recording head, were collected in a container and weighed with the container by an electronic balance. The average ink droplet weight during the $1\times10^6$ shots was calculated from the weight increase. The continuous ejection was performed for a total of $1\times10^8$ shots. The evaluation criteria were categorized as follows:

A: The average weight of the ink droplets ejected during $9.9\times10^7$–$1\times10^8$ shots is 90% or more of that during 0–$1\times10^6$ shots.

B: The average weight of the ink droplets ejected during $9.9\times10^7$–$1\times10^8$ shots is at least 70% but less than 90% of that during 0–$1\times10^6$ shots.

C: The average weight of the ink droplets ejected during $9.9\times10^7$–$1\times10^8$ shots is less than 70% of that during 0–$1\times10^6$ shots.

D: Ejection stopped before $1\times10^8$ shots.

Amount of Kogation

The recording head having been subjected to the above ejection durability evaluation was disassembled, and the surface of the heater in the nozzle was observed under an optical microscope (400×magnification). The amount of kogation was evaluated using the following criteria:

A: Little kogation was observed;

B: A little kogation was observed;

C: Certain amount of kogation was observed;

D: Large amount of kogation was observed.

TABLE 1

| | Type of Polyol Phosphoric Acid | Vth (V) | r value | Vop (V) | (1) Ejection Durability | (2) Amount of Kogation |
|---|---|---|---|---|---|---|
| Example 1 | disodium tartrate dihydrate 2 parts | 21.0 | 1.39 | 24.8 | A | A |
| Example 2 | disodium tartrate dihydrate 2 parts | 21.1 | 1.10 | 22.1 | A | A |
| Example 3 | disodium tartrate dihydrate 2 parts | 20.9 | 1.48 | 25.4 | A | B |
| Reference Example 1 | disodium tartrate dihydrate 2 parts | 20.9 | 1.56 | 26.1 | C | B |
| Reference Example 2 | disodium tartrate dihydrate 2 parts | 20.8 | 1.61 | 26.4 | D | C |
| Reference Example 3 | disodium tartrate dihydrate 2 parts | 21.0 | 1.69 | 27.3 | D | D |
| Comparative Example 1 | none | 20.9 | 1.39 | 24.6 | C | C |

Examples 4–13 and Comparative Examples 2–11

The components shown below are mixed, fully stirred and dissolved, then subjected to pressure filtration with a micro-filter of 0.2 μm pore size (from Fuji Photo Film Co., Ltd.), to prepare ink for use in Examples 4–8.

| | |
|---|---|
| Ink Composition for Example 4 | |
| PROJET FAST BLACK 2 (available from Zeneca) | 2 parts |
| diethylene glycol | 10 parts |
| mucic acid | 0.5 parts |
| sodium hydroxide | 1 part |
| water | 86.5 parts |
| Ink Composition for Example 5 | |
| PROJET FAST YELLOW 2 (available from Zeneca) | 3 parts |
| diethylene glycol | 10 parts |
| disodium tartrate dihydrate | 1 part |
| water | 86 parts |
| Ink Composition for Example 6 | |
| PROJET FAST MAGENTA 2 (available from Zeneca) | 3 parts |
| diethylene glycol | 10 parts |
| disodium tartrate dihydrate | 2 parts |
| water | 85 parts |
| Ink Composition for Example 7 | |
| PROJET FAST CYAN 2 (available from Zeneca) | 4 parts |
| diethylene glycol | 10 parts |
| dilithium tartrate monohydrate | 1 part |
| water | 85 parts |
| Ink Composition for Example 8 | |
| PROJET FAST BLACK 2 (available from Zeneca) | 2 parts |
| glycerol | 5 parts |
| diethylene glycol | 5 parts |
| urea | 4 parts |
| 2-propanol | 3.5 parts |
| disodium tartrate dihydrate | 10 parts |
| sodium hydroxide | 0.1 parts |
| ammonium sulfate | 0.1 parts |
| water | 70.3 parts |
| Ink Preparation for Example 9 | |
| <Preparation of Pigment Dispersing Liquid 1> | |
| styrene - acrylic acid - butyl acrylate copolymer (acid value 116, average molecular weight 3700) | 5 parts |
| triethanolamine | 0.5 parts |
| diethylene glycol | 5 parts |
| water | 69.5 parts |

The above components were mixed and heated in a water bath to 70° C., so that the resin component was fully dissolved. Then carbon black "MA-100" (pH 3.5; available from Mitsubishi Chemical Industries Ltd.), 15 parts, and 2-propanol, 5 parts, were added to this solution. After premixing for 30 minutes, the solution was subjected to dispersing treatment under the following conditions:

Disperser SAND GRINDER (available from Igarashi Kikai Co., Ltd.)

Grinding Media zirconium beads 1 mm in diameter

Filling Rate of Grinding Media 50% (volume)

Grinding Time 3 hours

Then the above solution was subjected to centrifugal dispersing treatment (12000 rpm, 20 minutes) to remove large-sized particles. The pigment dispersing liquid 1 was thus obtained.

<Preparation of Ink for Example 9>

The components below were mixed in a beaker and stirred at 25° C. for 3 hours. The ink for Example 9 was thus obtained.

| | |
|---|---|
| pigment dispersing liquid 1 | 30 parts |
| diethylene glycol | 10 parts |
| 2-propanol | 2 parts |
| disodium tartrate dihydrate | 1 part |
| water | 57 parts |
| Ink Preparation for Example 10 | |

<Preparation of Pigment Dispersing Liquid 2>

300 g of commercially available acid carbon black "MA77" (pH 3; available from Mitsubishi Chemical Corp.) was fully mixed into 1000 ml of water, and then, 450 g of sodium hypochlorite (12% available chlorine concentration) was added dropwise to the solution, and the mixture was stirred at 100–150° C. for 10 hours. The slurry thus obtained was filtered with TOYO Filter Paper No. 2 (available from Advantest Corporation), and the pigment particles were fully washed with water. This wet pigment cake was dispersed again into 3000 ml of water and the dispersion was deionized with a reverse osmosis membrane until the electric conductivity became 0.2 μs. This pigment dispersion (pH=8–10) was further concentrated to a pigment concentration of 10 wt %. Thereby, a —COONa group was introduced onto the surface of the carbon black.

<Preparation of Ink for Example 10>

The components below were mixed in a beaker and stirred at 25° C. for 3 hours. Then the mixture was subjected to pressure filtration with a membrane filter of 3.0 μm pore size (available from Sumitomo Electric Industries, Ltd.). The ink for Example 10 was thus obtained.

| | |
|---|---|
| pigment dispersing liquid 2 | 30 parts |
| glycerol | 5 parts |
| trimethylolpropane | 5 parts |
| acetyleneglycol ethylene oxide addition product (Trade name: Acetylenol EH, Kawaken Fine Chemicals Co., Ltd.) | 0.2 parts |
| disodium tartrate dihydrate | 1 part |
| water | 58.8 parts |
| Ink preparation for Example 11 | |
| <Preparation of Pigment Dispersing Liquid 3> | |
| styrene - acrylic acid copolymer (acid value 200, average molecular weight 7000) | 5.5 parts |
| monoethanolamine | 1.0 part |

-continued

| | |
|---|---|
| ion-exchange water | 67.5 parts |
| diethylene glycol | 5.0 parts |

The above components were mixed and heated in a water bath to 70° C., so that the resin component was fully dissolved. Then 20 parts of C.I. Pigment Yellow 93 and 1.0 part of isopropyl alcohol were added to this solution. After premixing for 30 min., the solution was subjected to dispersing treatment under the following conditions:

Disperser: SAND GRINDER

Grinding Media: glass beads 1 mm in diameter

Filling Rate of Grinding Media: 50% (volume)

Grinding Time: 3 hours.

Then the above solution was subjected to centrifugal dispersing treatment (12000 rpm, 20 minutes) to remove coarse particles. The pigment dispersing liquid 3 was thus obtained.

<Preparation of Ink>

The components below were mixed in a beaker and stirred at 25° C. for 3 hours. The ink for Example 11 was thus obtained.

| | |
|---|---|
| pigment dispersing liquid 3 | 20 parts |
| glycerol | 15 parts |
| diethylene glycol | 10 parts |
| Acetylenol EH (available from Kawaken Fine Chemicals Co., Ltd.) | 0.3 parts |
| disodium tartrate dihydrate | 1 part |
| water | 53.7 parts |
| Ink preparation for Example 12 | |
| (Preparation of Pigment Dispersing Liquid 4) | |
| styrene - acrylic acid copolymer (acid value 200, average molecular weight 7000) | 5.5 parts |
| monoethanolamine | 1.0 part |
| ion-exchange water | 67.5 parts |
| diethylene glycol | 5.0 parts |

The above components were mixed and heated in a water bath to 70° C., so that the resin component was fully dissolved. Then 20 parts of C.I. Pigment Red 122 and 1.0 part of isopropyl alcohol were added to this solution. After premixing for 30 minutes, the solution was subjected to dispersing treatment under the following conditions:

Disperser: SAND GRINDER

Grinding Media: glass beads 1 mm in diameter

Filling Rate of Grinding Media: 50% (volume)

Grinding Time: 3 hours.

Then the above solution was subjected to centrifugal dispersing treatment (12000 rpm, 20 minutes) to remove coarse particles. The pigment dispersing liquid 4 was thus obtained.

<Preparation of Ink>

The components below were mixed in a beaker and stirred at 25° C. for 3 hours. The ink for Example 12 was thus obtained for use in the present invention.

| | |
|---|---|
| pigment dispersing liquid 4 | 20 parts |
| glycerol | 15 parts |
| diethylene glycol | 10 parts |
| Acetylenol EH (available from Kawaken Fine | 0.3 parts |

-continued

| | |
|---|---|
| Chemicals Co., Ltd.) | |
| disodium tartrate dihydrate | 1 part |
| water | 53.7 parts |
| Ink preparation for Example 13 | |
| (Preparation of Pigment Dispersing Liquid 5) | |
| styrene - acrylic acid copolymer | 5.5 parts |
| (acid value 200, average molecular weight 7000) | |
| monoethanolamine | 1.0 part |
| ion-exchange water | 67.5 parts |
| diethylene glycol | 5.0 parts |

The above components were mixed and heated in a water bath to 70° C., so that the resin component was fully dissolved.

Then 20 parts of C.I. Pigment Blue 15: 3 and 1.0 part of isopropyl alcohol were added to this solution. After premixing for 30 minutes, the solution was subjected to dispersing treatment under the following conditions:

Disperser: SAND GRINDER

Grinding Media: glass beads 1 mm in diameter

Filling Rate of Grinding Media: 50% (volume)

Grinding Time: 3 hours.

Then the above solution was subjected to centrifugal dispersing treatment (12000 rpm, 20 minutes) to remove coarse particles. The pigment dispersing liquid 5 was thus obtained.

<Preparation of Ink>

The components below were mixed in a beaker and stirred at 25° C. for 3 hours. The ink for Example 13 was thus obtained.

| | |
|---|---|
| pigment dispersing liquid 5 | 20 parts |
| glycerol | 15 parts |
| diethylene glycol | 10 parts |
| Acetylenol EH (available from Kawaken Fine Chemicals Co., Ltd.) | 0.3 parts |
| disodium tartrate dihydrate | 1 part |
| water | 53.7 parts |

<Ink preparation for Comparative Example 2–11>

The components shown below were mixed, fully stirred and dissolved, then subjected to pressure filtration with a microfilter of 0.2 μm pore size (from Fuji Photo Film Co., Ltd.) to prepare ink for use in Comparative Examples 2–11.

| | |
|---|---|
| <Ink Composition for Comparative Example 2> | |
| PROJET FAST BLACK 2 (available from Zeneca) | 2 parts |
| diethylene glycol | 10 parts |
| sodium hydroxide | 0.1 part |
| water | 87.9 parts |
| <Ink Composition for Comparative Example 3> | |
| PROJET FAST YELLOW 2 (available from Zeneca) | 3 parts |
| diethylene glycol | 10 parts |
| water | 87 parts |
| <Composition for Comparative Example 4> | |
| PROJET FAST MAGENTA 2 (available from Zeneca) | 3 parts |
| diethylene glycol | 10 parts |
| water | 87 parts |
| <Ink Composition for Comparative Example 5> | |
| PROJET FAST CYAN 2 (available from Zeneca) | 4 parts |

-continued

| | |
|---|---|
| diethylene glycol | 10 parts |
| water | 86 parts |
| <Ink Composition for Comparative Example 6> | |
| PROJET FAST BLACK 2 (available from Zeneca) | 2 parts |
| glycerol | 5 parts |
| diethylene glycol | 5 parts |
| urea | 5 parts |
| sodium hydroxide | 0.1 parts |
| ammonium sulfate | 0.1 parts |
| water | 82.8 parts |

<Ink Composition for Comparative Example 7>

The components below were mixed in a beaker and stirred at 25° C. for 3 hours. The ink was thus obtained for Comparative Example 7.

| | |
|---|---|
| pigment dispersing liquid 1 | 30 parts |
| diethylene glycol | 10 parts |
| 2-propanol | 2 parts |
| water | 58 parts |

<Ink Composition for Comparative Example 8>

The components below were mixed in a beaker and stirred at 25° C. for 3 hours. Then the mixture was subjected to pressure filtration with a membrane filter (available from Sumitomo Electric Industries, Ltd.) whose pore size was 3.0 μm. The ink for Comparative Example 8 was thus obtained.

| | |
|---|---|
| pigment dispersing liquid 2 | 30 parts |
| glycerol | 5 parts |
| trimethylolpropane | 5 parts |
| acetyleneglycol ethylene oxide addition product (Trade name: Acetylenol EH, Kawaken Fine Chemicals Co., Ltd.) | 0.2 parts |
| water | 59.8 parts |

<Ink preparation for Comparative Example 9>

The componenets below were mixed in a beaker and stirred at 25° C. for 3 hours. The ink for Comparative Example 9 was thus obtained.

| | |
|---|---|
| pigment dispersing liquid 3 | 20 parts |
| glycerol | 15 parts |
| diethylene glycol | 10 parts |
| Acetylenol EH (Kawaken Fine Chemicals Co., Ltd.) | 0.3 parts |
| water | 54.7 parts |

<Ink preparation for Comparative Example 10>

The componenets below were mixed in a beaker and stirred at 25° C. for 3 hours. The ink for Comparative Example 10 was thus obtained.

| | |
|---|---|
| pigment dispersing liquid 4 | 20 parts |
| glycerol | 15 parts |
| diethylene glycol | 10 parts |
| Acetylenol EH (Kawaken Fine Chemicals Co., Ltd.) | 0.3 parts |
| water | 54.7 parts |

<Ink preparation for Comparative Example 11>

The componenets below were mixed in a beaker and stirred at 25° C. for 3 hours. The ink for Comparative Example 11 was thus obtained.

| | |
|---|---|
| pigment dispersing liquid 5 | 20 parts |
| glycerol | 15 parts |
| diethylene glycol | 10 parts |
| Acetylenol EH (Kawaken Fine Chemicals Co., Ltd.) | 0.3 parts |
| water | 54.7 parts |

[Evaluation 2]

In Examples 4–13 and Comparative Examples 2–11, evaluation was carried out in the same manner as in above Evaluation 1. The results are shown in Table 2.

5. The method according to claim 1, wherein the aldarate is a tartrate.

6. The method according to claim 5, wherein the tartrate is at least one selected from the group consisting of lithium tartrate, sodium tartrate, potassium tartrate, sodium potassium tartrate and an organic ammonium salt of tartaric acid.

7. The method according to claim 1, wherein the coloring material is a water-soluble dye.

8. The method according to claim 1, wherein the coloring material is a pigment.

9. The method according to claim 1, wherein the ink contains water at 35 to 96 wt % of the ink.

TABLE 2

| | Type of Aldonic Acid | Coloring material | Vth (V) | r value | Vop (V) | (1) Ejection Durability | (2) Amount of Kogation |
|---|---|---|---|---|---|---|---|
| Example 4 | mucic acid 0.5 parts | PROJET FAST BLACK 2 2 parts | 21.0 | 1.39 | 24.8 | A | A |
| Example 5 | disodium tartrate dihydrate 1 part | PROJET FAST YELLOW 2 3 parts | 20.9 | 1.39 | 24.6 | A | A |
| Example 6 | disodium tartrate dihydrate 2 parts | PROJET FAST MAGENTA 2 3 parts | 21.1 | 1.39 | 24.9 | A | A |
| Example 7 | dilithium tartrate monohydrate 1 part | PROJET FAST CYAN 2 4 parts | 20.9 | 1.39 | 24.6 | A | A |
| Example 8 | disodium tartrate dihydrate 10 parts | PROJET FAST BLACK 2 2 parts | 21.3 | 1.39 | 25.1 | A | A |
| Example 9 | disodium tartrate dihydrate 1 part | CARBON BLACK 4.5 parts | 21.4 | 1.39 | 25.2 | A | A |
| Example 10 | disodium tartrate dihydrate 1 part | CARBON BLACK (COONa group introduced) 3 parts | 20.9 | 1.39 | 24.6 | A | A |
| Example 11 | disodium tartrate dihydrate 1 part | C.I. PIGMENT YELLOW 93 4 parts | 20.9 | 1.39 | 24.6 | A | A |
| Example 12 | disodium tartrate dihydrate 1 part | C.I. PIGMENT RED 122 4 parts | 21.2 | 1.39 | 25.0 | A | A |
| Example 13 | disodium tartrate dihydrate 1 part | C.I. PIGMENT BLUE 15:3 4 parts | 21.1 | 1.39 | 24.9 | A | A |
| Comparative Example 2 | none | PROJET FAST BLACK 2 2 parts | 20.7 | 1.39 | 24.4 | C | C |
| Comparative Example 3 | none | PROJET FAST YELLOW 2 3 parts | 21.0 | 1.39 | 24.8 | B | B |
| Comparative Example 4 | none | PROJET FAST MAGENTA 2 3 parts | 21.1 | 1.39 | 24.9 | C | C |
| Comparative Example 5 | none | PROJET FAST CYAN 2 4 parts | 20.8 | 1.39 | 24.5 | B | B |
| Comparative Example 6 | none | PROJET FAT BLACK 2 2 parts | 20.9 | 1.39 | 24.6 | B | B |
| Comparative Example 7 | none | CARBON BLACK 4.5 parts | 21.0 | 1.39 | 24.8 | B | B |
| Comparative Example 8 | none | CARBON BLACK (COONa group introduced) 3 parts | 21.1 | 1.39 | 24.9 | B | B |
| Comparative Example 9 | none | C.I. PIGMENT YELLOW 93 4 parts | 21.3 | 1.39 | 25.1 | B | B |
| Comparative Example 10 | none | C.I. PIGMENT RED 122 4 parts | 21.1 | 1.39 | 24.9 | C | C |
| Comparative Example 11 | none | C.I. PIGMENT BLUE 15:3 4 parts | 20.8 | 1.39 | 24.5 | C | C |

What is claimed is:

1. A method for alleviating kogation on a surface of a heater of a recording head of an ink-jet printer, the heater being arranged to apply thermal energy to ink in the recording head to eject ink from an opening in the recording head, said method comprising the steps of:

providing the heater with an outermost protection layer containing at least a metal or oxide thereof; and providing only one or more inks with the following components:

(a) a coloring material, (b) a liquid medium, and (c) at least one compound selected from the group consisting of aldaric acids and aldarates, wherein Eop, an energy amount applied to the heater to generate thermal energy to be applied to the ink, satisfies the following equation:

$$1.10 \leqq Eop/Eth \leqq 1.50$$

in which Eth denotes a minimum energy amount to be applied to the heater necessary for ejecting the ink from the head.

2. The method according to claim 1, wherein the metal is tantalum.

3. The method according to claim 1, wherein the metal oxide is an oxide of tantalum.

4. The method according to claim 1, wherein the aldaric acid is tartaric acid.

10. The method according to claim 1, wherein the total amount of the component (c) ranges from 0.005 wt % to 20 wt % of the ink.

11. An ink-jet recording method comprising the steps of:

applying pulse electric signals to a heater in an ink flow path of a recording head according to recording signals; and generating heat from the heater to heat ink in the ink flow path and ejecting the ink from an opening, wherein the ink is from among only one or more inks comprising the following components:

(a) a color material, (b) a liquid medium, and (c) at least one compound selected from the group consisting of aldaric acids and aldarates, and wherein Eop, an energy amount applied to the heater to generate thermal energy to be applied to the ink, satisfies the following equation:

$$1.10 \leqq Eop/Eth \leqq 1.50$$

in which Eth denotes a minium energy amount to be applied to the heater necessary for ejecting the ink from the head.

12. The ink jet recording method according to claim 11, wherein the coloring material is a water-soluble dye.

13. The ink-jet recording method according to claim 11, wherein the coloring material is a pigment.

14. The ink-jet recording method according to claim 11, wherein the aldaric acid is tartaric acid.

15. The ink-jet recording method according to claim 11, wherein the aldarate is a tartrate.

16. The ink-jet recording method according to claim 15, wherein the tartrate is at least one selected from the group consisting of lithium tartrate, sodium tartrate, potassium tartrate, sodium potassium tartrate and an organic ammonium salt of tartaric acid.

17. The ink-jet recording method according to claim 11, wherein the ink contains water at 35 to 96 wt % of the ink.

18. The ink-jet recording method according to claim 11, wherein the total amount of the component (c) ranges from 0.005 wt % to 20 wt %.

19. The ink-jet recording method according to claim 11, wherein the heater has an outermost protection layer containing at least one of a metal and an oxide thereof.

20. The ink-jet recording method according to claim 19, wherein the metal is tantalum.

21. The ink-jet recording method according to claim 19, wherein the oxide is tantalum oxide.

22. An ink-jet recording apparatus comprising:

an ink storing portion storing ink;

an ink-jet recording head provided with a heater for applying thermal energy to the ink introduced in an ink flow path from said ink storing portion;

means for applying electrical pulse signals to the heater in response to recording information, wherein the heater has an outermost protection layer containing at least one of a metal and an oxide thereof, and the ink is only from among one or more inks comprising the following components:

(a) a coloring material, (b) a liquid medium, and (c) at least one compound selected from the group consisting of aldaric acids and aldarates; and means for controlling an energy amount (Eop) applied to the heater to generate thermal energy to be applied to the ink so that Eop satisfies the following equation:

$$1.10 \leqq Eop/Eth \leqq 1.50$$

in which Eth denotes a minimum energy amount to be applied to the heater necessary for ejecting the ink from the head.

23. The ink-jet recording apparatus according to claim 22, wherein the metal is tantalum.

24. The ink-jet recording apparatus according to claim 22 or 23, wherein the metal oxide is an oxide of tantalum.

25. The ink-jet recording apparatus according to claim 22, wherein the total amount of the component (c) ranges from 0.005 wt %–20 wt % of the ink.

26. The ink-Jet recording apparatus according to claim 22, wherein the aldaric acid is tartaric acid.

27. The ink-jet recording apparatus according to claim 22, wherein the aldarate is a tartrate.

28. The ink-jet recording apparatus according to claim 27, wherein the tartrate is at least one selected from the group consisting of lithium tartrate, sodium tartrate, sodium tartrate, potassium tartrate and sodium potassium tartrate.

29. A method for increasing life of a recording head equipped with a heater, the recording head being an ink-jet recording head for ejecting ink through an opening by applying thermal energy to the ink, said method comprising the steps of:

providing the heater with an outermost protection layer containing at least a metal or oxide thereof; and providing only one or more inks with the following components:

(a) a coloring material, (b) a liquid medium, and (c) at least one compound selected from the group consisting of aldaric acids and aldarates, wherein Eop, an energy amount applied to the heater to generate thermal energy to be applied to the ink, satisfies the following equation:

$$1.10 \leqq Eop/Eth \leqq 1.50$$

in which Eth denotes a minimum energy amount to be applied to the heater necessary for ejecting the ink from the head.

30. The method for increasing life of a recording head according to claim 29, wherein the metal is tantalum.

31. The method for increasing life of a recording head according to claim 29, wherein the metal oxide is an oxide of tantalum.

32. The method according to claim 29, wherein the aldaric acid is tartaric acid.

33. The method according to claim 29, wherein the aldarate is a tartrate.

34. The method according to claim 33, wherein the tartrate is at least one selected from the group consisting of lithium tartrate, sodium tartrate, potassium tartrate, sodium potassium tartrate and an organic ammonium salt of tartaric acid.

35. The method according to claim 29, wherein the total amount of the component (c) ranges from 0.005 wt % to 20 wt %.

36. An ink set comprising first and second inks, adapted for an ink-jet recording apparatus which comprises an ink-jet head provided with heaters for applying thermal energy to the inks, and a means for applying electrical pulse signals to the heaters in response to recording information, the respective heaters having outermost protection layers containing at least one of a metal and an oxide thereof, and wherein the inks are different from each other with respect to the color thereof, and each of the inks comprises:

(a) a coloring material;

(b) a liquid medium; and (c) at least one compound selected from the group consisting of aldaric acids and aldarates.

* * * * *

UNITED STATES PATENT AND TRADEMARK OFFICE

CERTIFICATE OF CORRECTION

PATENT NO. : 6,425,659 B1
DATED : July 30, 2002
INVENTOR(S) : Katsuragi et al.

It is certified that error appears in the above-identified patent and that said Letters Patent is hereby corrected as shown below:

Column 1,
Line 16, “The” should read -- There --.

Column 2,
Line 16, “unknown,” should read -- known --.

Column 3,
Line 24, “nozzle” should read -- nozzle of --.

Column 5,
Line 24, “M AGENTA” should read -- MAGENTA --.
Line 51, “styrone-acrylic” should read -- styrene-acrylic --.
Line 63, “esulfonate,” should read -- sulfonate, --.

Column 10,
Line 31, “heather” should read -- heater --.

Column 17,
Table 2 in Comparative Example 6, “FAT” should read -- FAST --.

Column 19,
Line 54, “ink-Jet” should read -- ink-jet --.

Column 20,
Line 1, “sodium tartrate,” should be deleted.
Line 2, “tartrate and sodium potassium tartrate.” should read -- tartrate, potassium tartrate, sodium potassium tartrate, and an organic ammonium salt of tartaric acid. --.

Signed and Sealed this

Eleventh Day of March, 2003

JAMES E. ROGAN
*Director of the United States Patent and Trademark Office*